(No Model.)
J. DOBINSON.
GLASS MANUFACTURE.
No. 246,478. Patented Aug. 30, 1881.
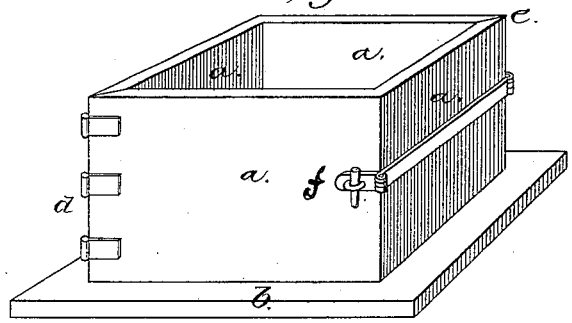
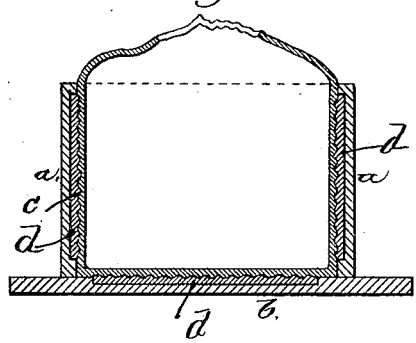
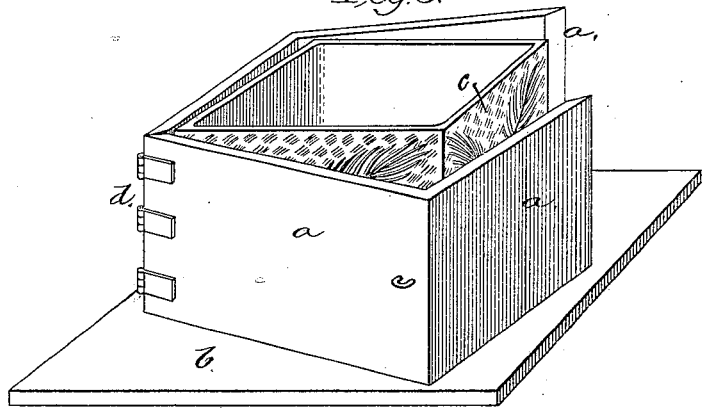
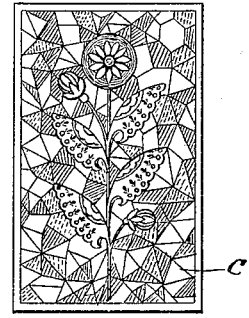
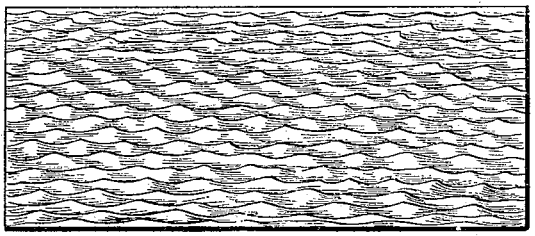
WITNESSES
Villette Anderson
Philip C. Masi.
INVENTOR
J. Dobinson,
by Anderson & Smith
his ATTORNEYS
N. PETERS. Photo-Lithographer, Washington, D. C.

UNITED STATES PATENT OFFICE.

JOSEPH DOBINSON, OF SOMERVILLE, MASSACHUSETTS.

GLASS-MANUFACTURE.

SPECIFICATION forming part of Letters Patent No. 246,478, dated August 30, 1881.

Application filed May 14, 1881. (No model.)

*To all whom it may concern:*

Be it known that I, JOSEPH DOBINSON, of Somerville, in the county of Middlesex and State of Massachusetts, have invented certain new and useful Improvements in Glass-Manufacture; and I do hereby declare that the following is a full, clear, and exact description of the same, reference being had to the accompanying drawings, forming part of this specification, in which—

Figure 1 is a view, in perspective, of a mold used in the manufacture of glass after my improved process. Fig. 2 is a vertical sectional view of the mold containing the side and bottom patterns and the molten material. Fig. 3 is a perspective view of the opened mold and contents before removal. Fig. 4 is a plan view of an ornamental pane of glass produced by my process and mold. Fig. 5 is a plan of an irregular pane of glass produced in varied colors in the mold; and Fig. 6 is a sectional view of the same, showing the irregular and the plain surface of the pane.

This invention has relation to glass-manufacture; and it consists, first, in a process of mixing various colors promiscuously in the pot previously to blowing the glass into the mold, then blowing the same into a rectangular mold open entirely across its top until the overblow bursts, then gradually cooling the contents of the mold, and finally cutting with a diamond five plates or panes of glass from the cooled mass, and thereby producing antique, or a substitute for antique, glass for windows and the like.

It consists, secondly, in a rectangular mold having an open top and closed bottom hinged at one corner, and provided with means for locking it at another corner, for the purpose of permitting the mold to be opened when it becomes necessary to remove the cooled contents.

It further consists in providing a rectangular mold having an open top with ornamental patterns secured to the four sides and the bottom, whereby these patterns may be reproduced in the surfaces coming in contact therewith, so that when the cooled mass of glass has been removed plates may be cut from said mass, one of the surfaces of which will retain said impression, all of which will be hereinafter fully described, and particularly pointed out in the claims.

Referring by letter to the accompanying drawings, *a* designates the sides of a mold, preferably made of iron, having a base, *b*, projecting beyond the vertical walls of the mold, and an open top, through which the molten glass is to be introduced to the mold.

*c* designates any desired ornament upon the block of material within the mold, and upon the face of the plate after it has been severed from the face of the block.

*d* designates the patterns, shown in Fig. 2, which may be varied to suit the designer. These patterns are made removable, and may be removed from the mold and others substituted at pleasure, in order to vary the design of the pane or plate to be cut from the cooled mass when removed from the mold.

*f* designates the fastening for the mold, which may be of any ordinary construction. As shown in the drawings, it consists of a hinged bar, staple, and pin or key for locking the bar to the staple.

My object is to produce air-cells, streaks, blisters in different shades and colors, and to produce figures, fruits, flowers, &c., on one pane or plate of glass, by previously mixing the colors irregularly or promiscuously and blowing the molten glass into the mold, where, after it has been gradually cooled, five ornamented or variegated plates of glass may be cut from the five surfaces which have come in contact with the sides and bottom of the mold by the use of a diamond or other suitable instrument. This method of producing the plates differs from the former methods of spinning and blowing cylinders or balls, and then opening them in a flattening-oven, or by the common method of making crown-glass.

From the foregoing description, taken in connection with the accompanying drawings, it is thought that any one skilled in the art to which this invention appertains will be enabled to work the invention.

Having thus fully described my invention, I claim as new—

1. The herein-described process of making plates or other articles of ornamented or antique glass, consisting of mixing in the pot previously to blowing a variety of colors, as specified.

2. In the manufacture of glass, the process of blowing a variegated molten mixture into a rectangular mold having an open top until the overblow bursts, then gradually cooling the contents of the mold, and finally cutting the cooled article at the edges, as specified.

In testimony that I claim the above I have hereunto subscribed my name in the presence of two witnesses.

JOSEPH DOBINSON.

Witnesses:
SAMUEL KILPATRICK,
THOMAS H. DOBINSON.